United States Patent
Gallucci et al.

(10) Patent No.: US 12,161,967 B2
(45) Date of Patent: Dec. 10, 2024

(54) METHOD FOR LOW HYDROGEN CONTENT SEPARATION FROM A NATURAL GAS MIXTURE

(71) Applicant: HYDROGEN ONSITE, S.L., Bilbao (ES)

(72) Inventors: Fausto Gallucci, Ae Eindhoven (NL); Maria Luisa Vittoria Nordio, Ae Eindhoven (NL); Solomon Assefa Wassie, Ae Eindhoven (NL); José Luis Viviente Sole, Donostia-San Sebastian (ES); David Alfredo Pacheco Tanaka, Donostia-San Sebastian (ES)

(73) Assignee: HYDROGEN ONSITE, S.L., Bilbao (ES)

( * ) Notice: Subject to any disclaimer, the term of this patent is extended or adjusted under 35 U.S.C. 154(b) by 658 days.

(21) Appl. No.: 17/299,533

(22) PCT Filed: Dec. 9, 2019

(86) PCT No.: PCT/NL2019/050814
§ 371 (c)(1),
(2) Date: Jun. 3, 2021

(87) PCT Pub. No.: WO2020/122709
PCT Pub. Date: Jun. 18, 2020

(65) Prior Publication Data
US 2021/0339190 A1    Nov. 4, 2021

Related U.S. Application Data

(60) Provisional application No. 62/777,318, filed on Dec. 10, 2018.

(51) Int. Cl.
*B01D 53/22* (2006.01)
*B01D 53/32* (2006.01)
(Continued)

(52) U.S. Cl.
CPC ......... *B01D 53/229* (2013.01); *B01D 53/226* (2013.01); *B01D 53/326* (2013.01);
(Continued)

(58) Field of Classification Search
CPC .. B01D 53/229; B01D 53/226; B01D 53/326; B01D 71/02231; B01D 2256/245;
(Continued)

(56) References Cited

U.S. PATENT DOCUMENTS 5,064,446 A    11/1991    Ube
5,217,506 A *  6/1993    Edlund ............... C07C 1/04
                                                    95/56
(Continued)

OTHER PUBLICATIONS

F. Gallucci, "Flexible Hybrid separation system for H 2 recovery from NG Grids", Jul. 21, 2016, p. 1-25, URL:https://www.hygrid-h2.eu/content/objectives; XP055663989.
(Continued)

*Primary Examiner* — Frank M Lawrence, Jr.
(74) *Attorney, Agent, or Firm* — Eschweiler & Potashnik, LLC

(57) ABSTRACT

A method for low hydrogen content separation from a natural gas mixture includes the following steps: a) providing a stream having hydrogen; b) transferring the stream having hydrogen of a) as an inlet stream to a first membrane unit for obtaining a retentate and a permeate, wherein the molar fraction of hydrogen in the permeate is higher that the molar fraction of hydrogen in the retentate, c) transferring the retentate to an electrochemical hydrogen compressor (EHC) for further hydrogen separation and purification.

20 Claims, 4 Drawing Sheets

(51) Int. Cl.
*B01D 71/02* (2006.01)
*C01B 3/50* (2006.01)

(52) U.S. Cl.
CPC ........ *B01D 71/02231* (2022.08); *C01B 3/505* (2013.01); *C01B 2203/0405* (2013.01)

(58) Field of Classification Search
CPC ..... B01D 2257/108; C01B 3/505; C01B 3/50; C01B 2203/0405
USPC .......................................... 95/55, 56; 96/4, 9
See application file for complete search history.

(56) References Cited

U.S. PATENT DOCUMENTS

| | | | | |
|---|---|---|---|---|
| 2008/0000350 | A1* | 1/2008 | Mundschau | B01D 53/226 95/55 |
| 2010/0122552 | A1* | 5/2010 | Schwartz | C01B 3/505 62/617 |
| 2010/0322845 | A1* | 12/2010 | De Souza | C01B 3/56 96/4 |
| 2017/0069921 | A1* | 3/2017 | Pollica | B01D 53/229 |

OTHER PUBLICATIONS

Fausto Prof. Gallucci et al, "Flexible Hybrid separation system for H2 recovery from NG Grids", Nov. 10, 2017, pp. 1-17, URL:https://ec.europa.eu/research/participants/documents/downloadPublic?documentlds=080166e5b6589948&appld=PPGMS; XP055663999.
International Search Report issued Feb. 14, 2020 re: Application No. PCT/NL2019/050814, pp. 1-4, citiing: Gallucci "Flexible Hybrid Separation . . . ", Prof. Gallucci et al. "Flexible Hybrid Separation . . . YouTube", U.S. Pat. No. 5,064,446 A, Suermann et al. "Electrochemical Hydrogen Compression . . . " and Chen et al. "Impact of vaccuum operation . . . ".
Michel Suermann et al, "Electrochemical Hydrogen Compression: Efficient Pressurization Concept Derived from an Energetic Evaluation", Journal of the Electrochemical Society, Jan. 1, 2017, vol. 164, No. 12, p. F1187-F1195; XP055664049.
Wei-Hsin Chen et al, "Impact of vacuum operation on hydrogen permeation through a palladium membrane tube", International Journal of Hydrogen Energy., vol. 44, No. 28, May 1, 2019 (May 1, 2019), p. 1-11; XP055663949.
Written Opinion issued Feb. 14, 2020 re: Application No. PCT/NL2019/050814, pp. 1-7, citiing: Gallucci "Flexible Hybrid Separation . . . ", Prof. Gallucci et al. "Flexible Hybrid Separation . . . YouTube", U.S. Pat. No. 5,064,446 A, Suermann et al. "Electrochemical Hydrogen Compression . . . " and Chen et al. "Impact of vaccuum operation . . . ".

\* cited by examiner

Fig. 4

Table 1 Performances of different configurations

| Configuration | HRF [%] | Purity [%] | Electric consumption [kWh/kgH2] | Membrane area [m²] | Hydrogen production [kg/day] | H2 Retentate to the grid [%] | H2 separated by the EHP [mol/h] | H2 final separation cost [€/kgH2] |
|---|---|---|---|---|---|---|---|---|
| A | 83.39 | 99.93 | 5.19 | 1.62 | 25 | 1.81 | 191.9 | 4.91 |
| B | 83.39 | 99.99 | 5.62 | 6.32 | 25 | 1.81 | 191.9 | 5.05 |
| C | 83.39 | 99.99 | 7.95 | 2.42 | 25 | 1.81 | 191.9 | 5.78 |
| A1 | 83.39 | 99.99 | 5.22 | 2.92 | 25 | 1.81 | 191.9 | 6.87 |
| A2 | 83.39 | 99.88 | 5.34 | 1.43 | 25 | 1.81 | 191.9 | 4.75 |
| A3 | 83.39 | 99.93 | 5.35 | 1.54 | 25 | 1.81 | 191.9 | 4.82 |
| A4 | 83.39 | 99.96 | 5.02 | 1.46 | 25 | 1.81 | 191.9 | 4.90 |
| A5 | 93.34 | 99.77 | 6.07 | 1.65 | 8.42 | 0.9 | 40.4 | 5.37 |
| A6 | 83.39 | 99.93 | 4.72 | 2.41 | 25 | 1.81 | 120.7 | 5.43 |
| B1 | 83.39 | 99.99 | 6.03 | 2.97 | 25 | 1.81 | 191.9 | 5.88 |
| B2 | 83.39 | 99.97 | 5.12 | 5.71 | 25 | 1.81 | 191.9 | 5.00 |
| C1 | 83.39 | 99.99 | 6.38 | 1.87 | 25 | 1.81 | 191.9 | 5.51 |

METHOD FOR LOW HYDROGEN CONTENT SEPARATION FROM A NATURAL GAS MIXTURE

TECHNICAL FIELD

The present disclosure relates to a method and an apparatus for low hydrogen content separation from a natural gas mixture.

BACKGROUND

There is a worldwide consensus on the fact that, although hydrogen can be produced from renewable energy sources (during off peak hours), its storage remains the largest drawbacks in any power-to-gas application. Different projects have foreseen hydrogen being injected into existing natural gas grids for initial (or long term) storage and subsequent use in a range of different applications (power generation, heat provision, transport applications such as gas fueled urban buses or passenger cars). The maximum hydrogen blend level is 5-20%, potentially even 25% depending on the gas grid infrastructure. Injecting the green hydrogen into the gas grid offers a number of advantages, such as sector coupling, gas decarbonization, energy storage and easy distribution (with the existing infrastructure) and of course hydrogen de-risking. The maximum blend level of hydrogen into the gas grid varies greatly across European countries; for instance, in Belgium and UK up to 3% while in Netherlands and Germany from 10-14% (in volume percent). As an average gas concentration, it seems that 10% will be the basis for large scale deployment of hydrogen injection. However, the main question here is how efficiently and cheaply can, the injected hydrogen, be separated and purified from the natural gas grid. Hence, the other key aspect is the separation of this low concentration hydrogen from the natural gas mixture for further applications.

Conventional technology for hydrogen separation is Pressure Swing Adsorption (PSA). This unit is based on sorbent material which is used to adsorb the non-hydrogen component at elevated pressure. In a PSA system the separated and purified hydrogen is delivered at high pressure while the nonhydrogen compound is discharged at lower pressure. However, if the incoming gas mixture is from high pressure stream (natural gas grid), the non-hydrogen stream needs to be compressed to be sent back to the natural gas grid. For that, two mechanical compressors are required in the system. The first compressor is to reach the adsorption pressure for separation of hydrogen while the second one is necessary for compressing the natural gas back to the grid. However, if such a system is employed for separation of lower hydrogen concentration this system would require substantial amount of compression energy and compressor capital for the reinjection of depleted hydrogen gas back to the grid, which makes it quite uneconomical.

PSA system works efficiently at large scale and higher hydrogen concentration, but becomes inefficient at low concentrations, for instance if the hydrogen in the stream is lower than 10%, 10 volume of gas per volume of hydrogen needs to be pressurized to a high-pressure ratio which makes the PSA option inefficient. PSA unit are sized as a function of the amount of impurities in the gas mixture that needs to be purified; so, with low hydrogen concentrations, PSA units become very large. In addition, the higher the adsorption pressure, the purer the hydrogen discharged but larger the energy consumption required to pressurize back to the grid (the non-hydrogen compound).

PSA unit are commercially available in the market for large scale system while for small scale unit, the hydrogen separation costs of such a system substantially increases. If hydrogen is used for fuel cell applications, high purity and low pressures are required, making the PSA unit even more inefficient for separation of low hydrogen concentration. Hydrogen separation from natural gas grid from low hydrogen concentration (lower than 25%, typically 10%) is costly, energy intensive and not efficient.

Recently, the world energy consumption is changing, driven by the need of new green energy sources for the reduction of the greenhouse gas emissions. The fast development of renewable energies as green technology has created many problems in the grid management (due to their production intermittence) which could be solved by the joint force of the smart grid and storage systems. A future hydrogen economy could present a possible solution for solving the problem of energy storage. The possibility to exploit the renewable electricity excess production, which may occur during the day, to produce hydrogen by electrolysers offer one possible solution for solving the grid/energy storage issues. Therefore, converting electrical energy into chemical energy and storing the produced chemical energy is becoming a viable option. In that regard, the concept of blending hydrogen into natural gas pipeline networks is becoming more attractive because it allows the delivery of pure hydrogen to markets, using separation and purification technologies downstream close to the point of end use. In addition, the wide extension of the natural gas grid could be exploited to distribute hydrogen. At relatively low hydrogen concentrations, blending may require minor modifications to the operation of the pipeline network, and it can also defray the cost of building dedicated hydrogen pipelines. Overall, adding hydrogen to natural gas grid could significantly reduce the greenhouse gas emissions if the hydrogen is produced from low-carbon energy sources such as biomass, solar, wind or nuclear.

Then, the hydrogen blend compound could be extracted downstream and used directly in automotive or fuel cell applications or can be employed as energy carrier for power production via traditional power plants. The blended hydrogen can be separated and purified for different applications (e.g. fuel cell) and supply the natural gas grid with low or no hydrogen concentration to the end users.

SUMMARY

The present disclosure provides different system configurations for hydrogen separation and purification from the blended natural gas grid.

The present disclosure provides a method for low hydrogen content separation from a natural gas mixture which offers better efficiency, low cost, superior separation ability for low concentration, easy scalability and simplicity.

The present disclosure thus relates to a method for low hydrogen content separation from a natural gas mixture, wherein the method comprises:
   a) providing a stream comprising hydrogen;
   b) transferring the stream comprising hydrogen as an inlet stream to a first membrane unit for obtaining a retentate and a permeate, wherein the molar fraction of hydrogen in the permeate is higher than the molar fraction of hydrogen in the retentate,
   c) transferring the retentate to an electrochemical hydrogen compressor (EHC) for further hydrogen separation and purification.

The present method brings substantial synergy effect of one-another while improving the total hydrogen recovery, purity and total cost of hydrogen. In an embodiment of the present disclosure natural gas (composed of 10% H2-90% CH4 and some impurities) coming from the grid is heated to the required temperature of the membrane separation unit. Impurities like sulphur may be first removed using a desulphurization unit. In a first membrane module a large amount of hydrogen is separated. The retentate side from the first membrane module is then sent to the electrochemical hydrogen compressor (EHC) to further recover the remaining hydrogen. The separated and purified hydrogen from the membrane module and the EHC is mixed and can be sent for further applications. The present inventors found that some advantages of the present disclosure are: high hydrogen recovery, high purity, high efficiency, low energy consumption, easy scalability. In addition, the present inventors found that recovery and purity may be adapted by, inter alia, changing the type and size of membrane and electrochemical compressor.

The electrochemical hydrogen compressor (EHC) can simultaneously compress and purify the hydrogen while purifying it from other contaminants thanks to the protonic membrane that permits almost only the permeation of protons through it; a very small amount of other contaminants can permeate. The EHC includes the compression of hydrogen through the electrochemical reaction reported in equations (1), (2) and (3).

$$\text{Anode } H_2^{LP} \rightarrow 2H^+ + 2e^- \tag{1}$$

$$\text{Cathode } 2H^{+2}e^- \rightarrow H_2^{HP} \tag{2}$$

$$\text{Overall } H_2^{LP} \rightarrow H_2^{HP} \tag{3}$$

Since it does not have movable parts, the compressed hydrogen is not contaminated by the oil necessary as a lubricant for the movable parts and the maintenance needed for the system is low. The lack of movable parts avoids the production of noise, making the EHC more suitable for many applications where the acoustical emission is a constraint. The EHC also has the advantage to be a compact device which promotes the scalability. Usually, for a large-scale system, the single units are placed electrically in series and in parallel with respect to the gas flow in order to process the required volume flowrate having the cells working at the same condition due to the same current in each cells.

The polarization curve gives information on the electrochemical resistance of the EHC. The voltage losses, usually called overpotential, can be divided into three regions: the active, ohmic and mass-transfer limiting regions. It was accepted that in the low current density region, the active overpotential predominates. In the intermediate region, the cell internal resistance, mainly attributed to the membrane resistance, becomes the major factor resulting in a linear trend of the discharge curve in this region. In the high current density region, the overall cell reaction rate is limited by depletion of the reactants. Consequently, the mass-transfer overpotential becomes the dominant factor and causes a sharp decay in the current density at a constant applied voltage. The electrochemical hydrogen compressor (EHC) is typically operated at a temperature of 65° C. and a pressure of 8 bar in the anode and cathode side. The applied voltage is 0.3 V.

According to an embodiment the present method further comprises step b1), wherein the permeate of step b) is sent as an inlet stream to a second membrane unit, in which second membrane unit a second retentate and a second permeate is produced, wherein the molar fraction of hydrogen in the second permeate is higher than the molar fraction of hydrogen in the second retentate, the second retentate is sent back as an inlet stream to the membrane unit of step b). Such an embodiment guarantees very high hydrogen purity (99.99%) compared to the embodiment with only the first membrane unit thanks to the further purification achieved with the second membrane module. Such an embodiment guarantees relatively high purity because of the two membrane modules in series which assure a substantial purification of the stream comprising hydrogen.

According to an embodiment the stream comprising hydrogen is heated in a heat exchanger to the operation temperature of the membrane unit before transferring the stream comprising hydrogen to the membrane unit. The working temperature of the membrane unit is about 400° C. thus it is preferred to heat the stream comprising hydrogen to the operation temperature of the membrane unit before transferring the stream comprising hydrogen to the membrane unit. Such an embodiment applies for the first membrane unit and/or the second membrane unit.

According to an embodiment the retentate obtained in step b) is cooled down in a heat exchanger to the operation temperature of the electrochemical hydrogen compressor (EHC) before transferring the retentate to the electrochemical hydrogen compressor (EHC). The retentate outlet stream is preferably cooled down in the heat exchanger mentioned before while heating the stream comprising hydrogen. The present inventors noticed that the electrochemical hydrogen compressor (EHC) gives better performances at higher temperature but the proper water management for the humidification of the protonic membrane has to be considered when choosing the operating conditions.

According to an embodiment a vacuum unit is used for increasing the driving force via the first and/or second membrane unit.

According to an embodiment the second retentate stream originating from the second membrane unit is heated in a heat exchanger before transferring the second retentate stream to the inlet of the first membrane unit. The working temperature of the second membrane unit is about 400° C. thus it is preferred to heat the second retentate stream originating from the second membrane unit in a heat exchanger before transferring the second retentate stream to the inlet of the first membrane unit.

According to an embodiment the first membrane unit is chosen from the group of Pd-based ceramic supported membrane and Pd-based metallic supported membrane. A Pd-based metallic supported membrane has lower hydrogen permeance but higher perm-selectivity compared to the ceramic supported membrane.

According to an embodiment the inlet pressure of the stream comprising hydrogen of a) is at least 5 bara. The present inventors found that by increasing the retentate pressure a lower surface area is needed but the purity increases due to higher driving force for the stream comprising hydrogen to permeate through. A lower membrane surface area is required because of the larger driving force along the membrane thanks to higher pressure difference.

According to an embodiment the permeate pressure of the first membrane unit is lower than 130 mbar. The present inventors found that for reaching the same HRF the membrane surface area is reduced with a lower vacuum. Since the electrochemical hydrogen compressor (EHC) investment cost has a relevant impact on the total distribution, a lower retentate pressure of the first membrane unit is beneficial.

According to an embodiment the hydrogen concentration of the stream comprising hydrogen of a) is at least 10 vol. %. The present inventors found that an increase of the $H_2$ concentration of the stream comprising hydrogen has resulted in a reduction of the membrane area and a slightly higher final purity. The present inventors assume that this effect is related to a higher contaminant driving force (higher methane concentration at the inlet).

According to an embodiment the permeate pressure of the first membrane unit is lower than 5 bar. A reduction of the permeate pressure of the first membrane unit will lead to a reduction of the surface area of the first module, thereby reducing the energy consumption.

According to an embodiment the retentate pressure of the second membrane unit is lower than 10 bar. Such a reduction of the retentate pressure of the second membrane has a positive influence on the overall energy consumption.

The present disclosure furthermore relates to an apparatus for low hydrogen content separation from a natural gas mixture, comprising:

a first membrane unit having an inlet for a stream comprising hydrogen, an outlet for retentate and an outlet for permeate, wherein the molar fraction of hydrogen in the permeate is higher than the molar fraction of hydrogen in the retentate, an electrochemical hydrogen compressor (EHC) having an inlet for the retentate, an outlet cathode site and an outlet anode site, wherein the molar fraction of hydrogen in the outlet cathode site is higher than the molar fraction of hydrogen in the outlet anode site.

In an embodiment the apparatus further comprises a second membrane unit, the second membrane unit having an inlet for a stream comprising hydrogen, an outlet for second retentate and an outlet for second permeate, wherein the molar fraction of hydrogen in the second permeate is higher than the molar fraction of hydrogen in the second retentate, wherein the outlet for retentate of the first membrane unit is connected to the inlet of the second membrane unit.

The present apparatus further comprises one or more heat exchangers, compressors and vacuum pumps.

BRIEF DESCRIPTION OF THE DRAWINGS

FIG. 4 is a table showing performances of different configurations calculated by the inventors.

DETAILED DESCRIPTION OF THE DRAWINGS

In order to make the technicians of this field better understand the present disclosure, the technical schemes in the embodiments of the present disclosure will be clearly and completely described by combining with the drawings in the embodiments of the present disclosure below. The term module is used to describe a complete unit composed of the membranes, the pressure support structure, the feed inlet, the outlet permeate and retentate streams, and an overall support structure. The flow that passes the membrane is called permeate. The materials rejected by the membrane are called retentate. In the present description the molar fraction of hydrogen in the permeate is higher than the molar fraction of hydrogen in the retentate.

Three different embodiments are proposed for hydrogen separation and purification from a 10% $H_2$ and 90% $CH_4$ mixture by combining palladium membrane, vacuum pump, mechanical compressor and electrochemical hydrogen compressor technologies. The reference for all the different embodiments is a production of 25 $kgH_2$/day; all the membrane surface area and feed rate were fixed based on this production.

Figure 1:
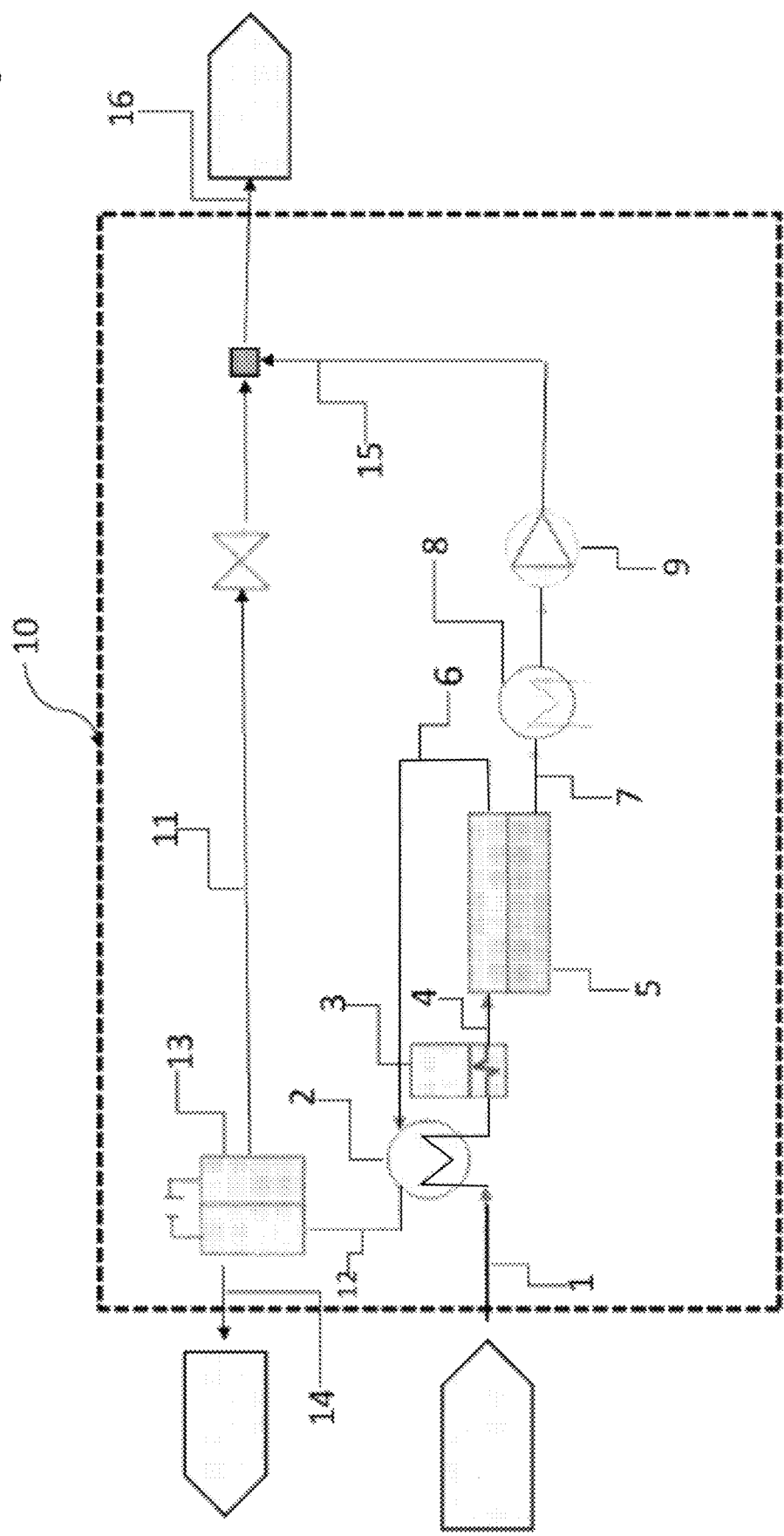
FIG. 1 is a process flow diagram for Embodiment 1 of the present disclosure.

FIG. 1 shows a process flow diagram 10 for Embodiment 1 of the present disclosure. An incoming stream 1 with a total flow rate of 6246.1 mol/h (coming from the grid) is initially pre-heated in a heat exchanger 2 using the outlet retentate stream 6 (while it is being cooled down), and then a heater 3 supplies the additional heat needed to reach the membrane working temperature of 400° C. After heater 3, stream 4 is sent to a membrane module 5, which has a surface area of 1.2 $m^2$. The selected membrane is Pd-based ceramic supported with a hydrogen permeance of $2.2*10^6$ $mol/s/m^2/Pa$ at 400° C. and an ideal perm-selectivity, defined as the ratio between $H_2$ and CH4 permeance at 1 bar pressure difference, of 20000 (obtained experimentally). The retentate side of the membrane is at 8 bara (same as the stream coming from the grid), while the permeate side was kept at 100 mbara by using vacuum pump 9 (to increase the driving force via the membrane). The permeate stream 7 is cooled down with a cooler 8 before entering a vacuum pump 9 (the maximum inlet temperature of the vacuum pump is 75° C.). The retentate stream 6 of the membrane module 5 is then sent to heat exchanger 2 and the thus cooled downstream 12 is sent to an electrochemical hydrogen compressor 13 (EHC) with a protonic membrane resistance of 6 mΩ and 350 cells in parallel with working temperature of 65° C. for further hydrogen separation and purification. The retentate outlet stream 6 is cooled down in the heat exchanger 2 previously mentioned while heating stream 1 coming from the grid. In addition, hydrogen 11 coming from the outlet cathode side of electrochemical hydrogen compressor 13 is kept at 8 bara to make sure the proper protonic membrane humidification which otherwise would be difficult to obtain at atmospheric pressure. Purified hydrogen 15 from the permeate side of membrane module 5 and hydrogen 11 from the cathode side of the electrochemical hydrogen compressor 13 are then mixed as stream 16, after depressurization of stream 11 from electrochemical hydrogen compressor 13. The outlet anode side stream 14 of the electrochemical hydrogen compressor 13 is sent back to the grid with no or low hydrogen concentration in stream 14 (depends on which configuration is chosen).

Figure 2:
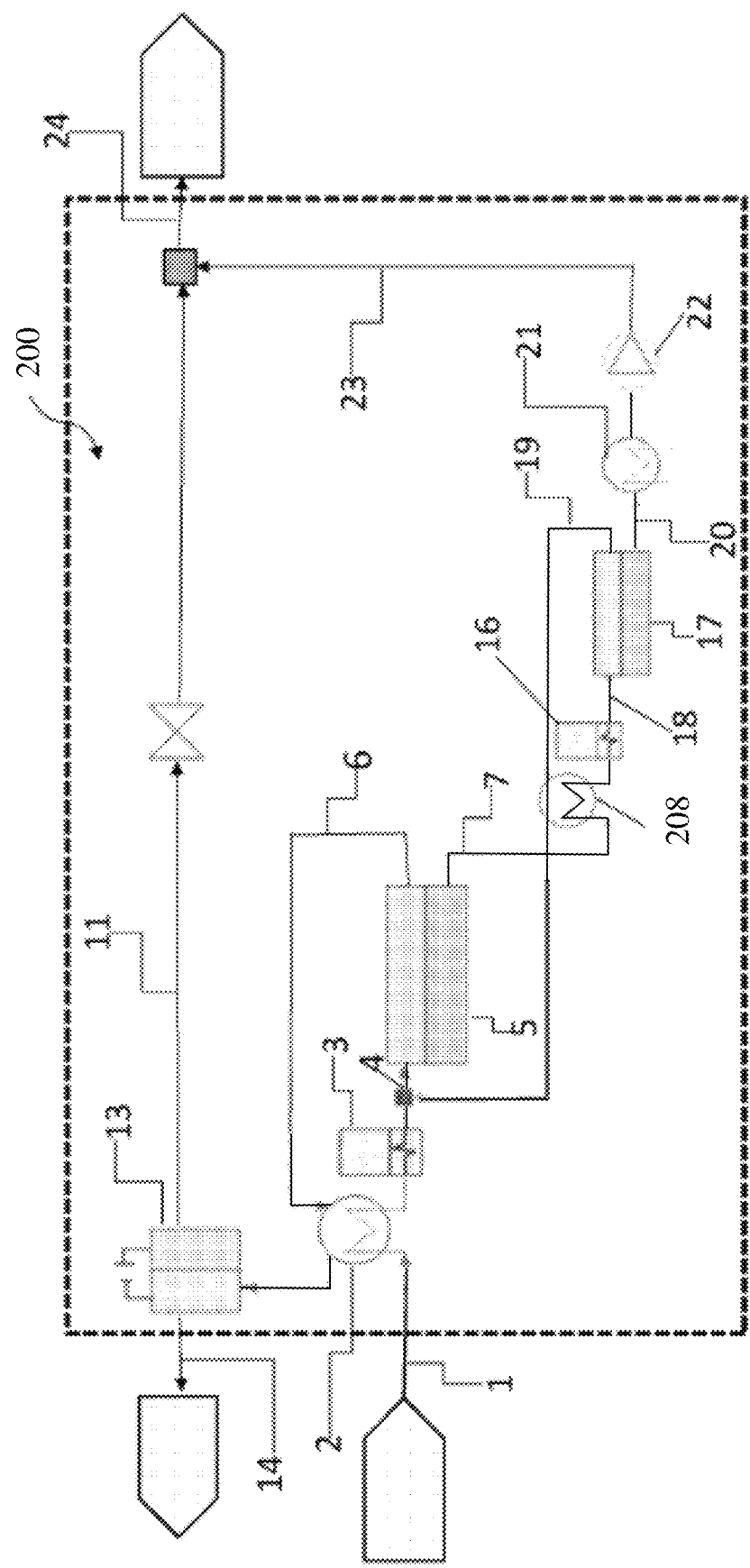
FIG. 2 is a process flow diagram for Embodiment 2 of the present disclosure.

FIG. 2 shows a process flow diagram 200 for Embodiment 2 of the present disclosure, which combines two membrane modules, carbon molecular sieve membrane (CMSM) and Pd-based ceramic supported membrane, vacuum pump and EHC. This configuration is proposed for the high-pressure gas grid (approx. 40-80 bar) which allows the connections between the two membrane modules without any mechanical compressor in between. The considered grid pressure is 40 bar with a total feed rate similar to Embodiment 1. Feed 1 is initially heated in heat exchanger 2 to reach the operating temperature of 70° C. Then after heat exchanger 2 and heater 3, a heated stream 4 is sent to a first membrane module 5 with a surface area of 5.02 $m^2$, which is a large surface area because the hydrogen permeance of CMSM is $7\text{-}10^8$ $mol/s/m^2/Pa$ at 70° C. with an ideal selectivity of 550 at 40 bar. The permeate side is kept at 3 bar to give enough driving force to membrane module 5 and keep a pressure difference for second membrane module 17. The permeate side 7 is heated in heat exchanger 8 and further heated in heater 16 and the temperature of stream 18 thus heated is about 400° C., which is the operating temperature of second membrane module 17 comprising a Pd-based membrane. The selected membrane is a ceramic supported Pd-based with a hydrogen permeance of 2.2-1 O⁶ mol/s/m²/Pa at 400° C. and 1 bar pressure difference and an ideal selectivity of 20000. A membrane area of 0.62 m² is required to achieve a final separation of 25 kg/day. Permeate side 20 of second membrane module 17 (using vacuum pump 22) was kept same as Embodiment 1 by using a heat exchanger 21. Outlet retentate 19 of second membrane module 17 is recycled and used as an inlet stream for first membrane module 5. Outlet retentate 6 of first membrane module 5 is heated in heat exchanger 2 and then sent to electrochemical hydrogen compressor 13 (EHC) to further purify the hydrogen. After mixing a stream of hydrogen 11 separated from electrochemical hydrogen compressor 13 (EHC) and a stream of hydrogen 23 coming from second membrane module 17 comprising a Pd-based membrane, mixed stream 24 is sent to the end user while retentate stream 14 is fed back to the grid.

Figure 3:
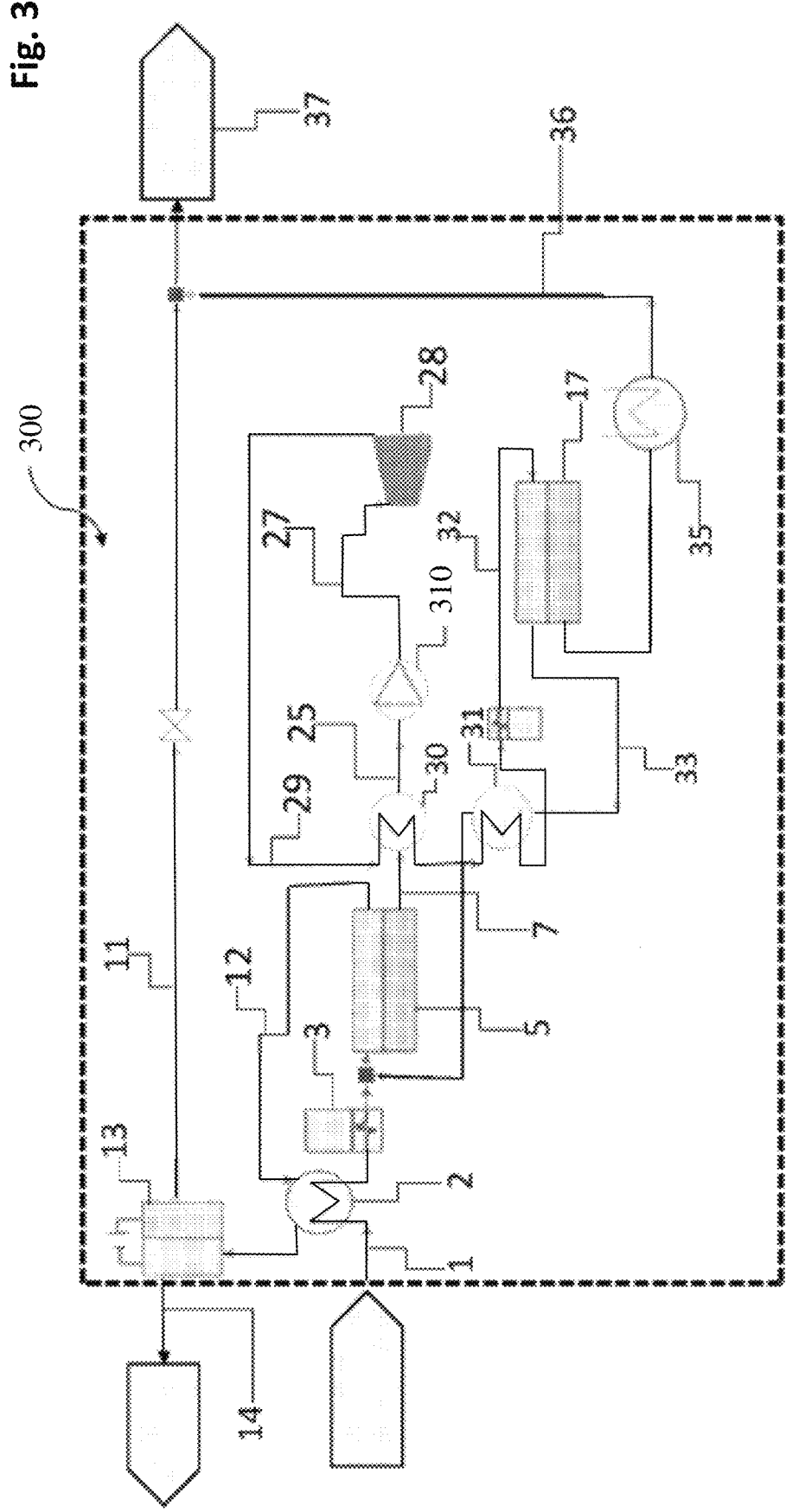
FIG. 3 is a process flow diagram for Embodiment 3 of the present disclosure.

FIG. 3 shows a process flow diagram 300 for Embodiment 3 of the present disclosure in which process flow diagram two membrane modules with a mechanical compressor in between, a vacuum pump and an EHC have been combined. The first membrane module 5 is a Pd-based ceramic supported membrane with an ultra-thin (1-3 pm) palladium layer which allows high hydrogen permeance with a lower selectivity compared to the membranes adopted for Embodiment 1 and 2. The hydrogen permeance and the ideal perm-selectivity were 4*1 O⁶ mol/s/m²/Pa and 4000 respectively. The second membrane module 17, which is connected in series to the previous one, is a Pd-based double-skin membrane with a hydrogen permeance of 2*1 O⁶ mol/s/m²/Pa and an ideal perm-selectivity of 60000. The second membrane module 17 is mainly responsible for increasing the hydrogen purity. Stream 1 which comes from the grid has the same feed rate and composition as Embodiment 1 and 2 and is also initially heated in heat exchanger 2 and heater 3 where outlet retentate stream 12 of the first membrane module 5 is cooled down to 65° C., which is the working temperature of electrochemical hydrogen compressor 13 (EHC). Outlet anode side 14 of electrochemical hydrogen compressor 13 (EHC) is sent back to the natural gas grid. After heater 3, the stream is sent to first membrane module 5 with a surface area of 1.2 m², while the permeate side was kept at a pressure of 100 mbara which was achieved using vacuum pump 310. Permeate stream 7 from first membrane module 7 is sent to heat exchanger 30 and stream 25 is sent to vacuum pump 310. Outlet stream 27 of vacuum pump 310 was then compressed to 8 bara in compressor 28 and then sent as stream 29 to second membrane module 17 with a surface area of 0.15 m² after two cascaded heat exchangers 30, 31. The thus obtained stream 32 is a feed stream for second membrane module 17. Retentate stream 33 from second membrane module 17 (mainly some impurities and remaining inextricable H₂) is sent back to first membrane module 5 for further purification. A stream of purified hydrogen 36 from second membrane module 17 and a stream 11 from the cathode side of electrochemical hydrogen compressor 13 (EHC) is then mixed as stream 37 and sent to the end users.

The inventors calculated the performance of different configurations. In the present description configuration A refers to Embodiment 1, configuration B to Embodiment 2 and configuration C to Embodiment 3. The results are shown in Table 1.

From configuration A, which includes a ceramic supported Pd-based membrane connected to a vacuum pump and an electrochemical hydrogen compressor, it was possible to recover 83.39% with a purity of 99.93%. The Pd-based membrane, with a surface area of 1.62 m², recovers 328.9 mol/h of H₂ and 0.3 mol/h of CH₄. The concentration polarization in the retentate side plays a role in terms of hydrogen driving force, i.e. the higher the retentate pressure, the higher the mass transfer limitation between the bulk and the palladium surface. The retentate side was then sent to the electrochemical hydrogen compressor (EHC), where an extra 191.9 mol/h of hydrogen with a purity of 100% is separated. By varying the applied voltage, it is possible to change the hydrogen recovery from the EHC (the efficiency of the EHP was considered to be 60% (optimal value for the energy consumption), while the voltage was changed consequently).

Configuration B guarantees very high hydrogen purity (99.99%) compared to configuration A thanks to the further purification achieved with the second membrane module. The membrane is responsible for separating 52.66% of hydrogen with a surface area of 6.32 m² and a purity of 91.61%. The final purity reached is higher than configuration A because it is easier to further purify the stream when contains 91.61% of hydrogen. The electric consumption required is associated only to the heat required to reach the working temperature of the system and was 5.62 kWh/kgH₂. The total hydrogen production separated in this configuration was 25 kg/day with only 1.81% of hydrogen is sent back to the grid. Therefore, with configuration B, it is even possible to produce high purity (99.99) hydrogen with power consumptions lower than 6 kWh/kg H₂.

On the other hand, configuration C gives higher hydrogen purity compared to the configurations A and B, but the energy consumption (7.95 kWh/kgH₂) required was the highest.

In configuration "A1", the type of membrane selected is a Pd based metallic supported membrane, which has lower hydrogen permeance but higher perm selectivity compared to the ceramic supported membrane. For this reason, the membrane area required to separate 25 kgˆ/day increases to 2.92 m² in the current configuration while the purity raises to 99.99%. The energy consumption is similar to configuration "A", lower than "B" and "C". Furthermore, the retentate pressure was varied for a proper understanding of the HRF and purity.

Configuration "A2" is based on an inlet pressure of 15 bara coming from the natural gas grid instead of 8 bara. From the results it is possible to notice that by increasing the retentate pressure, lower surface are is needed (1.43 m²), compared to the master configuration "A" (1.62 m²) but the purity drops from 99.93% to 99.88% due to higher driving force for the contaminant gas to permeate through. Lower membrane surface area is required because of the larger driving force along the membrane thanks to higher pressure difference; the energy consumption is very similar to master configuration "A".

In configuration "A3" the permeate pressure is changed from 100 mbar to 70 mbar to verify the influence of a different vacuum on the performance of the overall system in terms of purity. To reach the same HRF the membrane surface area is reduced from 1.62 m² for the master configuration "A" to 1.54 m² with a vacuum of 70 mbar.

Configuration "A4" considers a H₂ concentration from the natural gas grid of 15% instead of 10% like the previous cases, which results in a reduction of the membrane area from 1.62 to 1.56 m² and a slightly higher final purity (99.96%) compared to the master configuration (99.93%). According to the inventors this effect is related to the higher contaminant driving force (higher methane concentration at the inlet).

Configuration "A5" is based on a lower total flow rate from the grid: 1784.6 mol/h which 10% is $H_2$ and 90% $CH_4$. It is possible to increase the HRF of the membrane from 48.80% to 79.67% and from a total HRF of 79.52% to 91.86% with a purity of 99.77%. The hydrogen purity decreases for a combination of two different reasons. The first one is related to the lower hydrogen separated from the EHP, which could guarantee a purity of 100%, while the second reason is the higher mass transfer limitation occurring at lower flow rate. The main advantage of configuration "A5" relies on the better quality of the natural gas grid due to the lower hydrogen concentration going back to the natural gas grid (0.90%).

The aim of configuration "A6" is to reduce the hydrogen flow rate separated by the EHP, at the expense of the membrane surface and final separation cost, to reduce the energy consumption. The membrane area to keep the same HRF is increased to 2.41 $m^2$, with a reduction of the energy consumption from 5.19 of configuration "A", to 4.72 kWh/$kgH_2$.

Configuration "B1" differs from configuration "B" because of the type of membrane employed. In configuration B, a carbon molecular sieve membrane with a perm-selectivity of 550 was considered, while in case "B1", an ultra-thin Pd based ceramic supported membrane with a selectivity of 5000 is adopted in the first membrane module. The energy consumption raises due to the higher operating temperature of Pd-based membrane (400° C.) in contrast to carbon molecular sieve membrane (CMSM). The energy consumption is 6.03 instead of 5.62 kWh/$kgH_2$. Even if in case "B1" a lower surface area is required, due to the larger membrane costs and higher energy consumption, it results less economic convenient to adopt Pd-based membrane in the first membrane module. On the other hand, carbon molecular sieve membrane seems to be promising especially for separating hydrogen at high pressure grid.

Configuration "B2" is based on configuration "B" with the main difference of lower permeate pressure of the first membrane module (2 bar instead of 3). The surface area of the first module is reduced thanks to the more relevant driving force, on the other hand, the membrane surface of the second module raises because the retentate inlet pressure decreased.

Configuration "C" can guarantee relatively high purity because of the two membrane modules in series which assure a substantial purification of the stream. Configuration "C1" is based on a lower retentate pressure of the second membrane module, which is 4 bara instead of 8. In this configuration, the membrane area is reduced from 2.42 to 1.87 $m^2$ with a decrease in energy consumption from 7.95 to 6.38 kWh/$kgH_2$.

The invention claimed is:

1. A method of extracting hydrogen from a gas mixture, the method comprising:
   supplying a feed gas stream to a first heating unit to produce a heated feed gas stream;
   supplying the heated feed gas stream to a first membrane module, wherein the first membrane module produces a first permeate stream and a first retentate stream, and the first permeate stream has a higher molar fraction hydrogen than the first retentate stream;
   supplying the first permeate stream to a second membrane module, wherein the second membrane module produces a second permeate stream and a second retentate stream, and the second permeate stream has a higher molar fraction hydrogen than the second retentate stream;
   supplying the second retentate stream to the first membrane module;
   supplying the first retentate stream to an electrochemical hydrogen compressor (EHC), wherein the EHC extracts an EHC output stream from the first retentate stream; and
   combining the EHC output stream with the second permeate stream to provide a combined hydrogen stream.

2. The method of claim 1, further comprising:
   cooling the second permeate stream and pulling the second permeate stream through a vacuum pump prior to combining the EHC output stream with the second permeate stream; and
   flowing the EHC output stream through a pressure reducer prior to combining the EHC output stream with the second permeate stream.

3. The method of claim 2, wherein the EHC output stream is maintained at a pressure of 8 bara or greater at the EHC.

4. The method of claim 1, further comprising heating the first permeate stream in a second heating unit prior to supplying the first permeate stream to the second membrane module.

5. The method of claim 4, further comprising:
   flowing the first retentate stream through the first heating unit, wherein the first heating unit comprises a first heat exchanger through which heat is transferred from the first retentate stream to the feed gas stream; and
   flowing the second retentate stream through the second heating unit, wherein the second heating unit comprises a second heat exchanger through which heat is transferred from the second retentate stream to the first permeate stream.

6. The method of claim 5, wherein cooling of the first retentate stream in the first heating unit is limited so that the first retentate stream is supplied to the EHC at a temperature of at least 65° C.

7. The method of claim 5, wherein the second retentate stream is combined with the heated feed gas stream after the first heating unit.

8. The method of claim 1, wherein the first membrane module comprises a carbon molecular sieve and the second membrane module comprises a Pd-based membrane.

9. The method of claim 1, further comprising, drawing the first permeate stream through a vacuum pump and then pressurizing the first permeate stream in a compressor prior to supplying the first permeate stream to the second membrane module.

10. The method of claim 9, further comprising:
    passing the first permeate stream through a third heat exchanger before supplying to the vacuum pump; and
    heating the first permeate stream in a second heating unit after the compressor and prior to supplying the first permeate stream to the second membrane module;
    wherein the second membrane module is operated at a higher temperature than the first membrane module.

11. A method of extracting hydrogen from a gas mixture, the method comprising:
    supplying a feed gas stream to a first heating unit to produce a heated feed gas stream;
    supplying the heated feed gas stream to a first membrane module, wherein the first membrane module produces a first permeate stream and a first retentate stream, and the first permeate stream has a higher molar fraction hydrogen than the first retentate stream;

supplying the first permeate stream to a second membrane module, wherein the second membrane module produces a second permeate stream and a second retentate stream, and the second permeate stream has a higher molar fraction hydrogen than the second retentate stream;

supplying the second retentate stream to the first membrane module;

supplying the first retentate stream to an electrochemical hydrogen compressor (EHC) from, wherein the EHC extracts an EHC output stream from the first retentate stream; and combining the EHC output stream with the second permeate stream to provide a combined hydrogen stream; and drawing the first permeate stream through a vacuum pump and then pressurizing the first permeate stream in a compressor prior to supplying the first permeate stream to the second membrane module, wherein the compressor maintains the second permeate stream at a pressure greater than or equal to the combined hydrogen stream.

12. A method of extracting hydrogen from a gas mixture, the method comprising:

supplying a feed gas stream to a heating unit to produce a heated feed gas stream;

supplying the heated feed gas stream to a membrane module, wherein the membrane module produces a permeate stream and a retentate stream, and the permeate stream has a higher molar fraction hydrogen than the retentate stream;

drawing the permeate stream through a vacuum pump to lower a pressure of the permeate stream in the membrane module;

supplying an electrochemical hydrogen compressor (EHC) with the retentate stream, wherein the EHC extracts an EHC output stream from the retentate stream; and combining the EHC output stream with the permeate stream to provide a combined hydrogen stream.

13. The method of claim 12, further comprising, flowing the retentate stream through the heating unit, wherein the heating unit comprises a heat exchanger through which heat is transferred from the retentate stream to the feed gas stream.

14. The method of claim 13, wherein cooling of the retentate stream in the heating unit is limited so that the retentate stream is supplied to the EHC at a temperature of at least 65° C.

15. The method of claim 12, wherein the EHC output stream is maintained at a pressure of 8 bara or greater at the EHC.

16. The method of claim 12, further comprising removing sulfur from the feed gas stream in a desulphurization unit.

17. The method of claim 12, wherein the membrane module comprises a Pd-based membrane and the heated feed gas stream has a temperature of at least 400° C.

18. The method of claim 12, wherein feed gas stream is pressurized to at least 5 bara.

19. The method of claim 18, wherein the permeate stream has a pressure of 130 mbar or less.

20. The method of claim 19, wherein the feed gas stream is at least 10% hydrogen by volume.

* * * * *